C. R. DOANE.
Fruit-Jar Stopper.
No. 50,806. Patented Nov. 7, 1865.
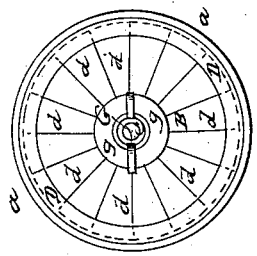
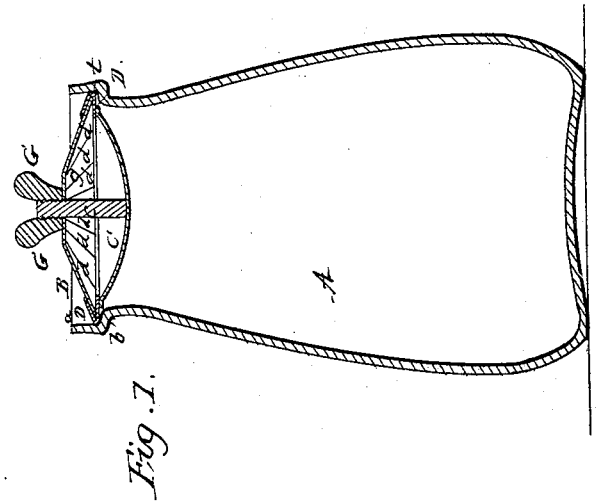
WITNESSES:
INVENTOR:

UNITED STATES PATENT OFFICE.

CHARLES R. DOANE, OF SPOTSWOOD, NEW JERSEY.

IMPROVED STOPPER FOR FRUIT-JARS.

Specification forming part of Letters Patent No. 50,806, dated November 7, 1865.

*To all whom it may concern:*

Be it known that I, CHARLES R. DOANE, of Spotswood, in the county of Middlesex and State of New Jersey, have invented a new and Improved Air-Tight Stopper for Preserve and Fruit Jars and Cans; and I do hereby declare that the following is a full and exact description thereof, reference being had to the accompanying drawings, making part of this specification:—

Figure 1 being a central vertical section of a jar provided with my improved stopper; Fig. 2, a top view of the same.

Like letters designate corresponding parts in both of the figures.

The can A, to which the stopper is applied, should have a shoulder, $b$, for the stopper to rest upon, and the mouth $a$, in which it tightens, would better contract a little in size upward, as shown, so that the stopper will be retained very securely therein.

The essential and important part of the improved stopper consists in a tightening disk-plate, B, of sheet-steel or equivalent material, somewhat conical or convex upward, as shown, and slit or divided radially, from near the center to the circumference, into a considerable number of divisions or sections, as shown at $d\ d\ d$ in the drawings. The disk is of sufficient diameter to reach outward to the mouth of the bottle before it will flatten to a plane. In connection with this tightening-disk, an annular packing, D, of india-rubber or its equivalent, is doubled around the disk and a counter-disk plate, C, entire, and, dishing or concave upward, is employed under the tightening-plate, substautially as shown in Fig. 1. This under disk is provided with a screw-stem, $c$, projecting centrally upward through a hole in the upper tightening-disk, B. A thumb-screw nut, G, screws over the screw-stem, so as to press the two disks toward each other. The packing-ring D packs both around the edge of the tightening-disk and between the two disks, as shown; and the operation of tightening, as the thumb-screw is applied, consists in flattening the disk B toward a plane, so that its diameter is increased, thus bearing and tightening against the packing-ring with great force around its entire periphery, the radial divisions of the disk allowing it to take different degrees of convexity at pleasure. At the same time the act of tightening with the thumb-screw draws the two disks toward each other, thus securely packing the outer edge, $f$, of the lower disk, C, upward against the packing-ring D. When the thumb-screw is loosened the upper disk springs upward in the middle into a more convex form, thus becoming less in diameter and unpacking the ring D; and the lower disk, C, is made a little smaller in diameter than the upper disk, and also than the shoulder $b$ of the jar, so that as the thumb-nut is raised the said lower disk drops by the force of its own gravity away from the packing-ring, thus admitting air into the jar and relieving the pressure on the stopper and allowing it to be readily removed.

What I claim as my invention, and desire to secure by Letters Patent, is—

The improved stopper composed of the radially divided or notched tightening-disk B, combined with the packing-ring D and counter-disk C, substantially as and for the purpose herein specified.

The above specification of my improved stopper for fruit and preserve cans signed by me this 19th day of July, 1865.

CHAS. R. DOANE.

Witnesses:
    JOSEPH NOTTINGHAM SMITH,
    W. M. B. MOUNT.